United States Patent
Chen et al.

(10) Patent No.: US 10,349,385 B2
(45) Date of Patent: Jul. 9, 2019

(54) METHODS AND APPARATUS FOR SUBFRAME CONFIGURATION FOR WIRELESS NETWORKS

(71) Applicant: QUALCOMM Incorporated, San Diego, CA (US)

(72) Inventors: Wanshi Chen, San Diego, CA (US); Hao Xu, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 127 days.

(21) Appl. No.: 13/894,874

(22) Filed: May 15, 2013

(65) Prior Publication Data
US 2013/0308568 A1    Nov. 21, 2013

Related U.S. Application Data

(60) Provisional application No. 61/647,811, filed on May 16, 2012.

(51) Int. Cl.
| | | |
|---|---|---|
| H04W 72/04 | (2009.01) | |
| H04L 1/00 | (2006.01) | |
| H04L 1/18 | (2006.01) | |

(52) U.S. Cl.
CPC ..... *H04W 72/0406* (2013.01); *H04W 72/042* (2013.01); *H04L 1/0061* (2013.01); *H04L 1/1887* (2013.01)

(58) Field of Classification Search
CPC ......... H04W 72/0406; H04W 72/0446; H04W 72/042; H04W 24/02; H04W 72/04;
(Continued)

(56) References Cited

U.S. PATENT DOCUMENTS

| | | | |
|---|---|---|---|
| 8,855,062 | B2 | 10/2014 | Khandekar et al. |
| 2009/0259909 | A1 | 10/2009 | Luo |

(Continued)

FOREIGN PATENT DOCUMENTS

| | | |
|---|---|---|
| CN | 102281099 A | 12/2011 |
| CN | 102387506 A | 3/2012 |

(Continued)

OTHER PUBLICATIONS

Iwamura et al., "Mobile Communication Method and Mobile Station", Feb. 24, 2011, WO, machine translation of WO 2011/021584.*

(Continued)

*Primary Examiner* — Paul H Masur
*Assistant Examiner* — Michael K Phillips
(74) *Attorney, Agent, or Firm* — Qualcomm Incorporated

(57) ABSTRACT

Certain aspects generally relate to methods and apparatus for subframe configuration for wireless networks. For example, certain aspects provide methods and apparatus for dynamically and/or reliably indicating at least one of a downlink or uplink subframe configuration. One method includes broadcasting an information block message including a first subframe configuration indicating at least one of which subframes of a set of subframes are for uplink transmissions or which subframes of the set of subframes are for downlink transmissions, determining a second subframe configuration suitable for handling communications with one or more user equipment (UEs), and signaling an indication of the second subframe configuration to the one or more UEs. Other methods includes receiving such a broadcast information block message, receiving signaling indicating a second subframe configuration suitable for handling communications with a base station, and communicating with the base (Continued)

US 10,349,385 B2

Page 2 station in accordance with the second subframe configuration.

106 Claims, 7 Drawing Sheets

(58) Field of Classification Search
CPC .......... H04W 72/0413; H04W 72/1289; H04L 1/18; H04L 5/0053; H04L 5/0055; H04L 1/1861; H04L 5/0094; H04L 1/1812; H04L 1/1896; H04L 5/0096; H04L 1/0061; H04L 1/1887
See application file for complete search history.

(56) References Cited

U.S. PATENT DOCUMENTS

| | | |
|---|---|---|
| 2009/0312008 A1 | 12/2009 | Lindoff et al. |
| 2010/0135220 A1* | 6/2010 | Bergstrom et al. ........... 370/329 |
| 2010/0172272 A1 | 7/2010 | Tenny |
| 2010/0265870 A1 | 10/2010 | Cai et al. |
| 2011/0211503 A1* | 9/2011 | Che et al. ...................... 370/280 |
| 2011/0310830 A1* | 12/2011 | Wu .................... H04W 72/1289 370/329 |
| 2012/0039292 A1* | 2/2012 | Lee ..................... H04L 27/2607 370/329 |
| 2012/0113875 A1* | 5/2012 | Alanara ............ H04W 72/1236 370/280 |
| 2012/0182869 A1* | 7/2012 | Iwamura et al. ............. 370/230 |
| 2012/0230273 A1* | 9/2012 | He ........................ H04L 1/1887 370/329 |
| 2012/0275400 A1* | 11/2012 | Chen .................... H04J 11/0033 370/329 |
| 2012/0281566 A1* | 11/2012 | Pelletier .............. H04W 76/046 370/252 |
| 2012/0300681 A1 | 11/2012 | Ji et al. |
| 2013/0083740 A1* | 4/2013 | Eriksson ............... H04L 1/1861 370/329 |
| 2013/0094411 A1* | 4/2013 | Zhang ........................... 370/281 |
| 2013/0094456 A1* | 4/2013 | Ng ................................ 370/329 |
| 2013/0176952 A1* | 7/2013 | Shin ........................ H04L 5/001 370/329 |
| 2013/0188516 A1* | 7/2013 | He ........................ H04W 28/16 370/254 |
| 2013/0194980 A1* | 8/2013 | Yin et al. ...................... 370/280 |
| 2013/0272169 A1* | 10/2013 | Wang ................ H04W 72/0446 370/280 |
| 2013/0272170 A1* | 10/2013 | Chatterjee et al. ........... 370/280 |
| 2013/0301490 A1* | 11/2013 | He et al. ....................... 370/280 |
| 2013/0301492 A1* | 11/2013 | Ji et al. .......................... 370/280 |
| 2013/0315321 A1* | 11/2013 | Rajagopal ........... H04L 27/2607 375/260 |
| 2013/0336177 A1* | 12/2013 | Gao .................. H04W 72/0446 370/280 |
| 2013/0336267 A1* | 12/2013 | Li et al. ......................... 370/329 |
| 2014/0092793 A1* | 4/2014 | Yang et al. .................... 370/280 |
| 2014/0126513 A1* | 5/2014 | Nguyen ............... H04L 5/0053 370/329 |
| 2014/0185539 A1* | 7/2014 | Seo et al. ...................... 370/329 |
| 2014/0226552 A1* | 8/2014 | Niu ......................... H04W 4/06 370/312 |

FOREIGN PATENT DOCUMENTS

| | | | |
|---|---|---|---|
| WO | 2010138925 | A1 | 12/2010 |
| WO | 2011/021584 | * | 2/2011 |
| WO | 2012142761 | A1 | 10/2012 |

OTHER PUBLICATIONS

Renesas Mobile Europe Ltd: "Discussion on Enhancements for Dynamic TDD UL-DL Configuration", 3GPP Draft; R1-122363, 3rd Generation Partnership Project (3GPP), Mobile Competence Centre; 650, Route Des Lucioles; F-06921 Sophia-Antipolis Cedex; France, vol. RAN WG1, No. Prague, Czech Republic; May 21, 2012-May 25, 2012, May 12, 2012 (May 12, 2012), 4 pages, XP050600626.
3GPP TS 36.213: "3rd Generation Partnership Project; LTE Physical Layer Procedures", Version 11.0.0, 3GPP, Oct. 2012, pp. 1-145.
Alcatel-Lucent Shanghai Bell et al: "Methods to support different time scales for TOO UL-DL reconfiguration", 3GPP Draft; R1-122508 Methods to Support Different Time Scales for TOO UL-DL Reconfiguration, 3rd Generation Partnership Project (3GPP), Mobile Competence Centre; 650, Route Des Lucioles; F-06921 Sophia-Antipolis Cedex; France, vol. RAN WG1, No. Prague, Czech Republic; May 21, 2012-May 25, 2012, May 12, 2012 (May 12, 2012), XP050601078, [retrieved on May 12, 2012].
International Search Report and Written Opinion—PCT/US2013/041302—ISA/EPO—dated Dec. 5, 2013.
LG Electronics: "TDD DL-UL Reconfiguration Methods for eIMTA", 3GPP Draft; R1-122318 TDD DL-UL Reconfiguration Methods for eIMTA_LG, 3rd Generation Partnership Project (3GPP), Mobile Competence Centre; 650, Route Des Lucioles; F-06921 Sophia-Antipolis Cedex; France, vol. RAN WG1, No. Prague, Czech Republic; May 21, 2012-May 25, 2012, May 12, 2012 (May 12, 2012), XP050600581, [retrieved on May 12, 2012].
Qualcomm Incorporated: "Signaling Mechanisms for Reconfiguration", 3GPP Draft; R1-130587 Signaling Mechanisms for Reconfiguration, 3rd Generation Partnership Project (3GPP), Mobile Competence Centre; 650, Route Des Lucioles; F-06921 Sophia-Antipolis Cedex; France vol. RAN WG1, No. St. Julian; Jan. 28, 2013-Feb. 1, 2013 Jan. 19, 2013 (Jan. 19, 2013), XP050663843.
Qualcomm Incorporated: "Signalling Mechanisms for TOO UL-DL Reconfiguration", Item 5, 3GPP Draft; R1-132488 Signaling Mechanism for TOO UL-DL Reconfiguration, 3rd Generation Partnership Project (3GPP), Mobile Competence Centre; 650, Route Des Lucioles; F-06921 Sophia-Antipolis Cedex vol. RAN WG1, No. Fukuoka, Japan; May 20, 20130520-May 24, 2013 May 11, 2013 (May 11, 2013), XP050698206.
Samsung: "Dynamic reconfiguration of TDD UL-DL configuration", 3GPP Draft; R1-122267 Dynamic Reconfiguration of TDD ULDL Configuration, 3rd Generation Partnership Project (3GPP), Mobile Competence Centre; 650, Route Des Lucioles; F-06921 Sophia-Antipolis Cedex; France, vol. RAN WG1, No. Prague, Czech Republic; May 21, 2012-May 25, 2012, May 12, 2012 (May 12, 2012), XP050600530, [retrieved on May 12, 2012].
Samsung: "Semi-static reconfiguration of TOO UL-DL configuration", 3GPP Draft; R1-122266 Semi-Static Reconfiguration of TOO UL-DL Configuration, 3rd Generation Partnership Project (3GPP), Mobile Competence Centre; 650, Route Des Lucioles; F-06921 Sophia-Antipolis Cedex; France, vol. RAN WG1, No. Prague, Czech Republic; May 21, 2012-May 25, 2012, May 12, 2012 (May 12, 2012), XP050600529, [retrieved on May 12, 2012].

* cited by examiner

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 0 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

FIG. 5

METHODS AND APPARATUS FOR SUBFRAME CONFIGURATION FOR WIRELESS NETWORKS

CROSS-REFERENCE TO RELATED APPLICATIONS

This application claims benefit of priority to U.S. Provisional Application Ser. No. 61/647,811, filed on May 16, 2012, which is expressly incorporated by reference herein in its entirety.

FIELD

Certain aspects of the present disclosure generally relate to methods and apparatus for subframe configuration for wireless networks and, for example, to dynamically and/or reliably indicate at least one of a downlink subframe configuration or an uplink subframe configuration.

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include Code Division Multiple Access (CDMA) systems, Time Division Multiple Access (TDMA) systems, Frequency Division Multiple Access (FDMA) systems, $3^{rd}$ Generation Partnership Project (3GPP) Long Term Evolution (LTE) systems, Long Term Evolution Advanced (LTE-A) systems, and Orthogonal Frequency Division Multiple Access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output, multiple-input single-output or a multiple-input multiple-output (MIMO) system.

As wireless communication technology advances, a growing number of different radio access technologies are being utilized. For instance, many geographic areas are now served by multiple wireless communication systems, each of which can utilize one or more different air interface technologies. In order to increase versatility of wireless terminals in such a network environment, there recently has been an increasing trend toward multi-mode wireless terminals that are able to operate under multiple radio technologies. For example, a multi-mode implementation can enable a terminal to select a system from among multiple systems in a geographic area, each of which may utilize different radio interface technologies, and subsequently communicate with one or more chosen systems.

SUMMARY

In an aspect of the disclosure, a method for wireless communications is provided. The method generally includes broadcasting an information block message including a first subframe configuration indicating at least one of which subframes of a set of subframes are for uplink transmissions or which subframes of the set of subframes are for downlink transmissions, determining a second subframe configuration suitable for handling communications with one or more user equipment (UEs), and signaling an indication of the second subframe configuration to the one or more UEs.

In an aspect of the disclosure, an apparatus for wireless communications is provided. The apparatus generally includes means for broadcasting an information block message including a first subframe configuration indicating at least one of which subframes of a set of subframes are for uplink transmissions or which subframes of the set of subframes are for downlink transmissions, means for determining a second subframe configuration suitable for handling communications with one or more user equipment, and means for signaling an indication of the second subframe configuration to the one or more UEs.

In an aspect of the disclosure, a computer program product is provided. The computer program product generally includes a computer-readable medium comprising code for broadcasting an information block message including a first subframe configuration indicating at least one of which subframes of a set of subframes are for uplink transmissions or which subframes of the set of subframes are for downlink transmissions, determining a second subframe configuration suitable for handling communications with one or more user equipment, and signaling an indication of the second subframe configuration to the one or more UEs.

In an aspect of the disclosure, an apparatus for wireless communications is provided. The apparatus generally includes a processing system configured to broadcast an information block message including a first subframe configuration indicating at least one of which subframes of a set of subframes are for uplink transmissions or which subframes of the set of subframes are for downlink transmissions, determine a second subframe configuration suitable for handling communications with one or more user equipment, and signal an indication of the second subframe configuration to the one or more UEs.

In an aspect of the disclosure, a method for wireless communications is provided. The method generally includes receiving a broadcast information block message including a first subframe configuration indicating at least one of which subframes of a set of subframes are for uplink transmissions or which subframes of the set of subframes are for downlink transmissions, receiving signaling indicating a second subframe configuration suitable for handling communications with a base station, and communicating with the base station in accordance with the second subframe configuration.

In an aspect of the disclosure, an apparatus for wireless communications is provided. The apparatus generally includes means for receiving a broadcast information block message including a first subframe configuration indicating at least one of which subframes of a set of subframes are for uplink transmissions or which subframes of the set of subframes are for downlink transmissions, means for receiving signaling indicating a second subframe configuration suitable for handling communications with a base station, and means for communicating with the base station in accordance with the second subframe configuration.

In an aspect of the disclosure, a computer program product is provided. The computer program product generally includes a computer-readable medium comprising code for receiving a broadcast information block message including a first subframe configuration indicating at least one of which subframes of a set of subframes are for uplink transmissions or which subframes of the set of subframes are for downlink transmissions, receiving signaling indicating a second subframe configuration suitable for handling communications with a base station, and communicating with the base station in accordance with the second subframe configuration.

In an aspect of the disclosure, an apparatus for wireless communications is provided. The apparatus generally includes a processing system configured to receive a broadcast information block message including a first subframe configuration indicating at least one of which subframes of a set of subframes are for uplink transmissions or which subframes of the set of subframes are for downlink transmissions, receive signaling indicating a second subframe configuration suitable for handling communications with a base station, and communicate with the base station in accordance with the second subframe configuration.

BRIEF DESCRIPTION OF THE DRAWINGS

Aspects and embodiments of the disclosure will become more apparent from the detailed description set forth below when taken in conjunction with the drawings in which like reference characters identify correspondingly throughout.

FIG. 5 illustrates an example list of downlink/uplink (DL/UL) configurations in a frame in the TDD-LTE standard in accordance with certain aspects of the present disclosure.

DETAILED DESCRIPTION

Figure 1:
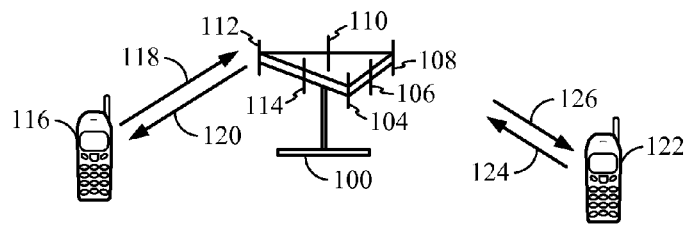
FIG. 1 illustrates an example multiple access wireless communication system in accordance with certain aspects of the present disclosure.

Various aspects of the disclosure are described more fully hereinafter with reference to the accompanying drawings.

This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95, and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS, and LTE are described in documents from an organization named "3rd Generation Partnership Project" (3GPP). CDMA2000 is described in documents from an organization named "3rd Generation Partnership Project 2" (3GPP2).

Single carrier frequency division multiple access (SC-FDMA) is a transmission technique that utilizes single carrier modulation at a transmitter side and frequency domain equalization at a receiver side. The SC-FDMA has similar performance and essentially the same overall complexity as those of OFDMA system. However, SC-FDMA signal has lower peak-to-average power ratio (PAPR) because of its inherent single carrier structure. The SC-FDMA has drawn great attention, especially in the uplink communications where lower PAPR greatly benefits the mobile terminal in terms of transmit power efficiency. It is currently a working assumption for uplink multiple access scheme in the 3GPP LTE and the Evolved UTRA.

An access point ("AP") may comprise, be implemented as, or known as NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as an access terminal, a subscriber station, a subscriber unit, a mobile station, a remote station, a remote terminal, a user terminal, a user agent, a user device, user equipment, a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

Referring to FIG. 1, a multiple access wireless communication system according to one aspect is illustrated. An access point 100 (AP) may include multiple antenna groups, one group including antennas 104 and 106, another group including antennas 108 and 110, and an additional group including antennas 112 and 114. In FIG. 1, only two antennas are shown for each antenna group, however, more or fewer antennas may be utilized for each antenna group. Access terminal 116 (AT) may be in communication with antennas 112 and 114, where antennas 112 and 114 transmit information to access terminal 116 over forward link 120 and receive information from access terminal 116 over reverse link 118. Access terminal 122 may be in communication with antennas 106 and 108, where antennas 106 and 108 transmit information to access terminal 122 over forward link 126 and receive information from access terminal 122 over reverse link 124. In a FDD system, communication links 118, 120, 124, and 126 may use different frequency for communication. For example, forward link 120 may use a different frequency than that used by reverse link 118.

Each group of antennas and/or the area in which they are designed to communicate is often referred to as a sector of the access point. In one aspect of the present disclosure, each antenna group may be designed to communicate to access terminals in a sector of the areas covered by access point 100.

In communication over forward links 120 and 126, the transmitting antennas of access point 100 may utilize beamforming in order to improve the signal-to-noise ratio of forward links for the different access terminals 116 and 122. Also, an access point using beamforming to transmit to access terminals scattered randomly through its coverage causes less interference to access terminals in neighboring cells than an access point transmitting through a single antenna to all its access terminals.

Figure 2:
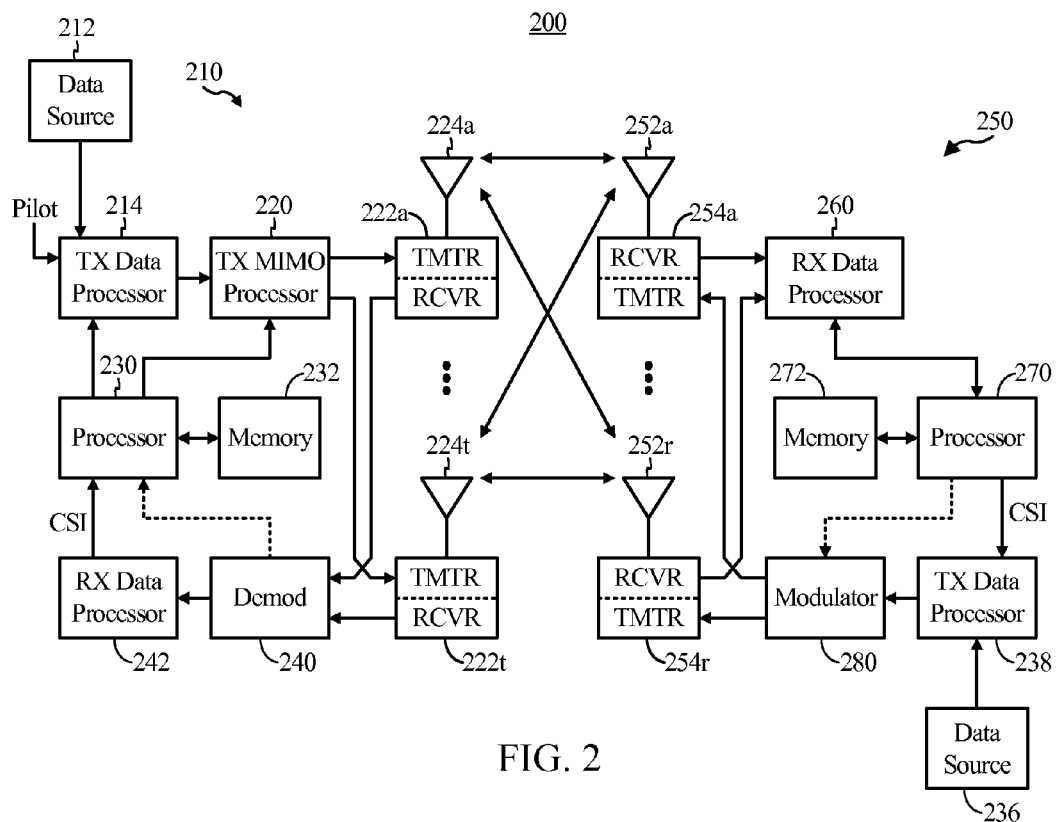
FIG. 2 illustrates a block diagram of an access point and a user terminal in accordance with certain aspects of the present disclosure.

FIG. 2 illustrates a block diagram of an aspect of a transmitter system 210 (also known as the access point) and a receiver system 250 (also known as the access terminal) in a multiple-input multiple-output (MIMO) system 200. At the transmitter system 210, traffic data for a number of data streams is provided from a data source 212 to a transmit (TX) data processor 214.

In one aspect of the present disclosure, each data stream may be transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230. Memory 232 may store data and software for the transmitter system 210.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain aspects of the present disclosure, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals may be received by $N_R$ antennas 252a through 252r and the received signal from each antenna 252 may be provided to a respective receiver (RCVR) 254a through 254r. Each receiver 254 may condition (e.g., filters, amplifies, and downconverts) a respective received signal, digitize the conditioned signal to provide samples, and further process the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 may be complementary to that performed by TX MIMO processor 220 and TX data processor 214 at transmitter system 210.

A processor 270 periodically determines which pre-coding matrix to use. Processor 270 formulates a reverse link message comprising a matrix index portion and a rank value portion. Memory 272 may store data and software for the receiver system 250. The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights, and then processes the extracted message.

Figure 3:
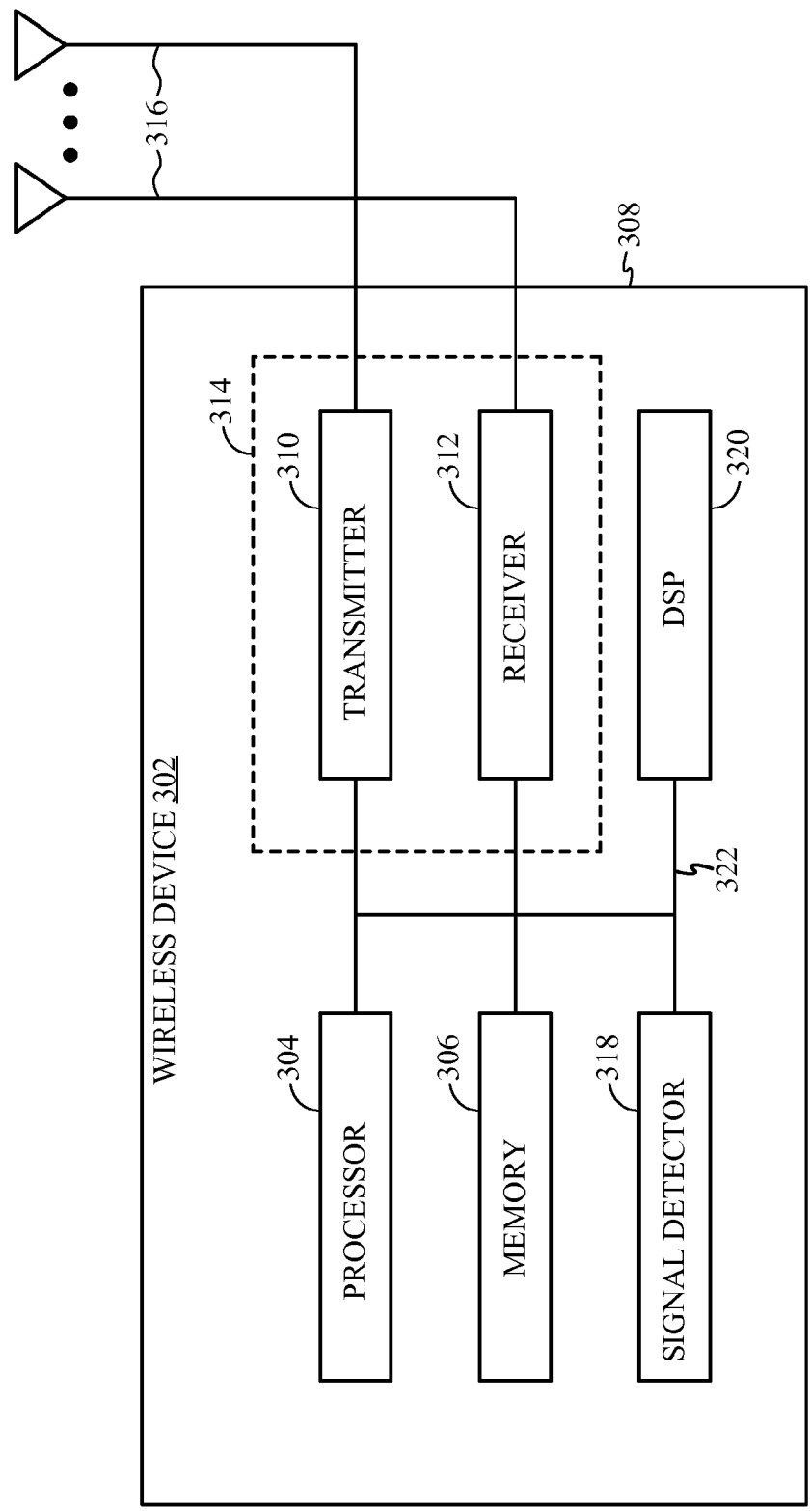
FIG. 3 illustrates various components that may be utilized in a wireless device in accordance with certain aspects of the present disclosure.

FIG. 3 illustrates various components that may be utilized in a wireless device 302 that may be employed within the wireless communication system illustrated in FIG. 1. The wireless device 302 is an example of a device that may be configured to implement the various methods described herein. The wireless device 302 may be a base station 100 or any of user terminals 116 and 122.

The wireless device 302 may include a processor 304 that controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

Figure 4:
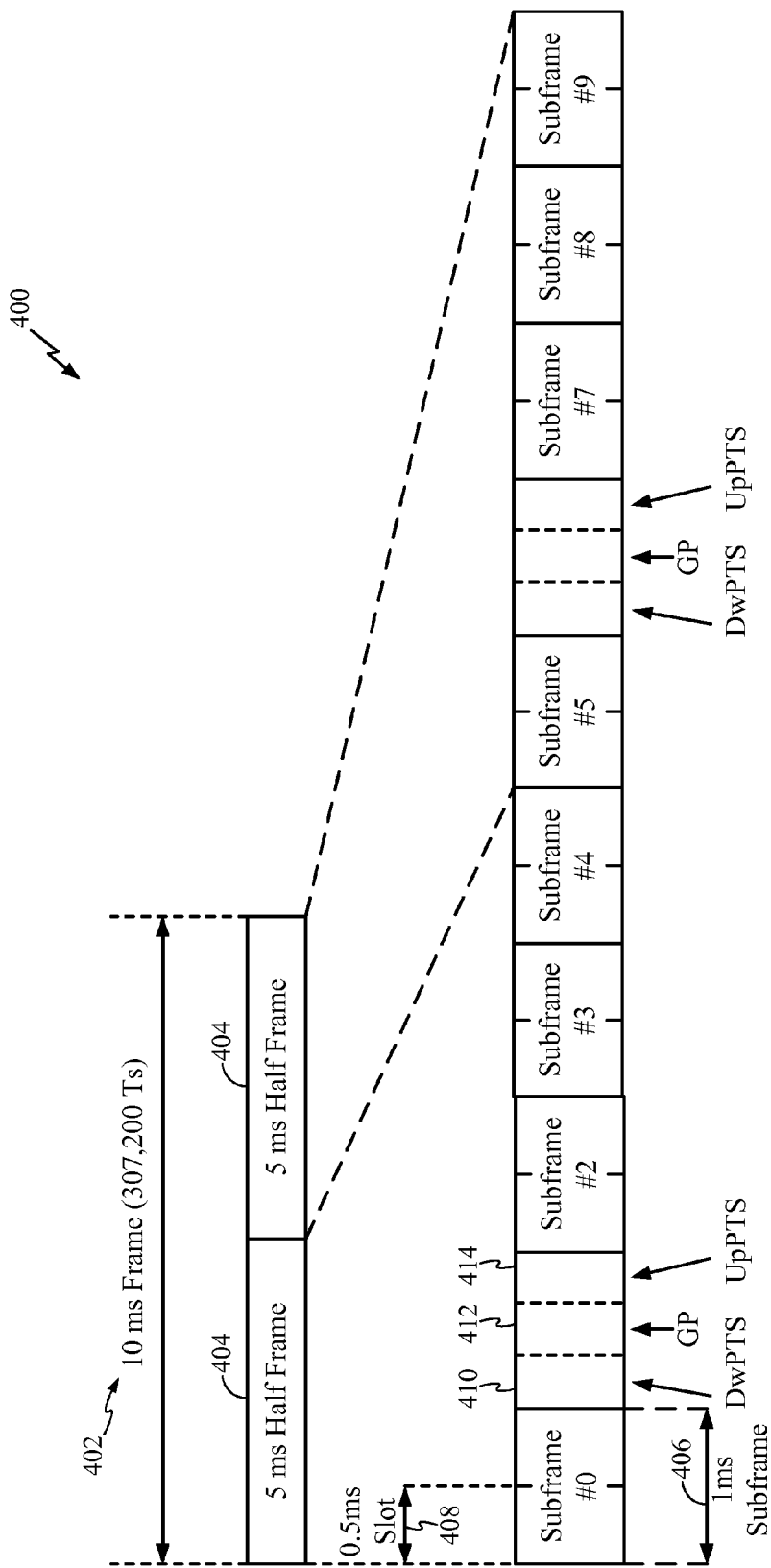
FIG. 4 is a block diagram conceptually illustrating an example of a frame structure in a telecommunications system in accordance with certain aspects of the present disclosure.

FIG. 4 shows a frame structure 400 for a Time Division Duplex Long Term Evolution (TDD-LTE) carrier. The TDD-LTE carrier, as illustrated, has a frame 402 that is 10 ms in length. The frame 402 has two 5 ms half frames 404, and each of the half frames 404 includes five 1 ms subframes 406. Each subframe 406 may be a downlink subframe (D), an uplink subframe (U), or a special subframe (S). Downlink subframes and uplink subframes may be divided into two 0.5 ms slots 408. Special subframes may be divided into a downlink pilot time slot (DwPTS) 410, a guard period (GP) 412, and an uplink pilot time slot (UpPTS) 414. Depending on the configuration, the duration of DwPTS, UpPTS, and GP may vary.

FIG. 5 illustrates an example list of the downlink/uplink configurations in a TDD-LTE frame 402 according to the LTE standard. In this table D, U, and S indicate Downlink, Uplink and Special subframes 406, respectively. The special subframe S may include DwPTS 410, GP 412, and UpPTS 414 fields. As illustrated, several DL/UL configurations with 5 ms switch point periodicity and 10 ms switch point periodicity may be chosen for an TDD-LTE frame 402. The configurations with 5 ms switch point periodicity may include two special subframes within a frame, while configurations with 10 ms switch point periodicity may include one special subframe within a frame. The configurations 0, 1, and 2 may have two identical 5 ms half-frames 404 within a 10 ms TDD-LTE frame 402. Although seven configurations are shown in FIG. 5, a larger or smaller number of configurations and/or different configurations may be employed by the present methods and apparatus.

Subframe Configuration for Wireless Networks

A UE may communicate with a base station in accordance with a subframe configuration, such as those illustrated in FIG. 5. The UE may receive a broadcast information block message (e.g., System Information Block) indicating the subframe configuration to utilize for communicating with the base station. For certain aspects of the present disclosure, the subframe configuration utilized between the UE and the base station may be changed dynamically based on the actual traffic needs. For example, if, during a short duration, a large data burst on downlink is needed, the configuration may be changed, for example, from configuration #1 (6 DL: 4 UL) to configuration #5 (9 DL: 1 UL), as illustrated in FIG. 5. For certain aspects, the adaptation of the TDD configuration is expected to be no slower than 640 ms. However, the adaptation may be as fast as 10 ms (i.e., length of 1 radio frame). If the UE does not properly detect a change in the subframe configuration, the UE may waste resources and cause interference to other UEs while communicating with the base station. Therefore, certain aspects of the present disclosure provide techniques for dynamically and reliably indicating the TDD downlink/uplink subframe configuration in a frame.

Figure 6:
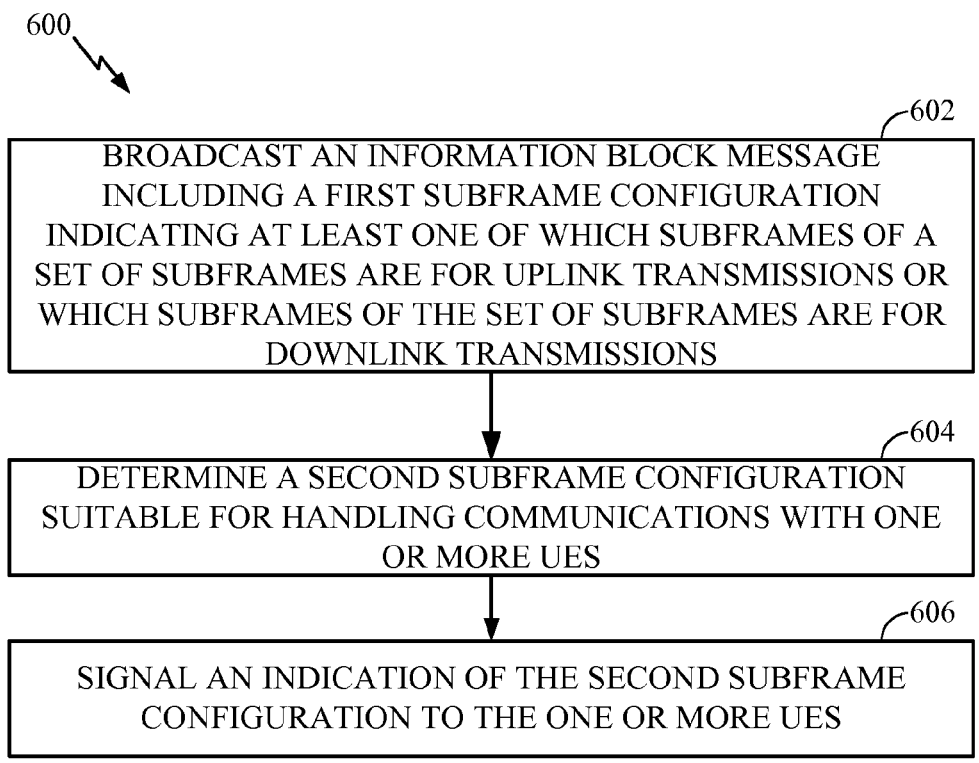
FIG. 6 illustrates example operations for dynamically changing a subframe configuration utilized among wireless communication devices, in accordance with certain aspects of the present disclosure.

FIG. 6 illustrates example operations 600 for dynamically changing a subframe configuration utilized among wireless communication devices (e.g., between one or more UEs and a base station), in accordance with certain aspects of the present disclosure. The operations 600 may be performed, for example, by the base station. At 602, the base station may broadcast an information block message including a first subframe configuration indicating at least one of which subframes of a set of subframes are for uplink transmissions or which subframes of the set of subframes are for downlink transmissions. Such broadcast may be repeated based on a time period.

At 604, the base station may determine a second subframe configuration suitable for handling communications with the one or more UEs. For example, the communications with the one or more UEs may include a burst of downlink or uplink data for a UE, and the second subframe configuration may include more subframes for such transmission than the first subframe configuration.

At 606, the base station may signal an indication of the second subframe configuration to the one or more UEs (e.g., before broadcasting another information block message including a subframe configuration). If there a limited number of UEs (e.g., 1 or 2), dedicated signaling may be preferred. Otherwise, multi-cast or broadcast signaling may be preferred.

For certain aspects, the indication may include one or more bits for indicating the second subframe configuration. For example, with seven DL/UL subframe configurations (as illustrated in FIG. 5), three bits may be required to indicate one of the seven configurations. However, if more configurations are to be supported, additional bits may be required. There may also be a need to limit the number of possible configurations for the second subframe configuration based on the first subframe configuration. As an example, for a first subframe configuration of configuration #0 (4DL: 6UL), only 4 possible configurations for the second subframe configurations may be allowed, namely, configuration #0, #1, #2, and #5, and only two bits may be required to indicate one of the four configurations.

For certain aspects, the signaling may be repeated based on a predetermined number, a broadcast signal, and/or a radio resource control signal. The repetition may be in the same subframe (e.g., first subframe of the frame), or different subframes (e.g., the first and the second subframes). While the same information is repeated, the detailed physical layer transmission mechanism may be the same or different.

For certain aspects, the signaling may provide an indication of a duration for utilizing the second subframe configuration or when to employ the second subframe configuration. For example, a 3-bit information field may be used to indicate the configuration is to be used for 1, 2, 4, 8, 16, 32, or 64 frames, or an information field may be used to indicate the duration may start after 8, 16, or 24 frames.

Figure 7:
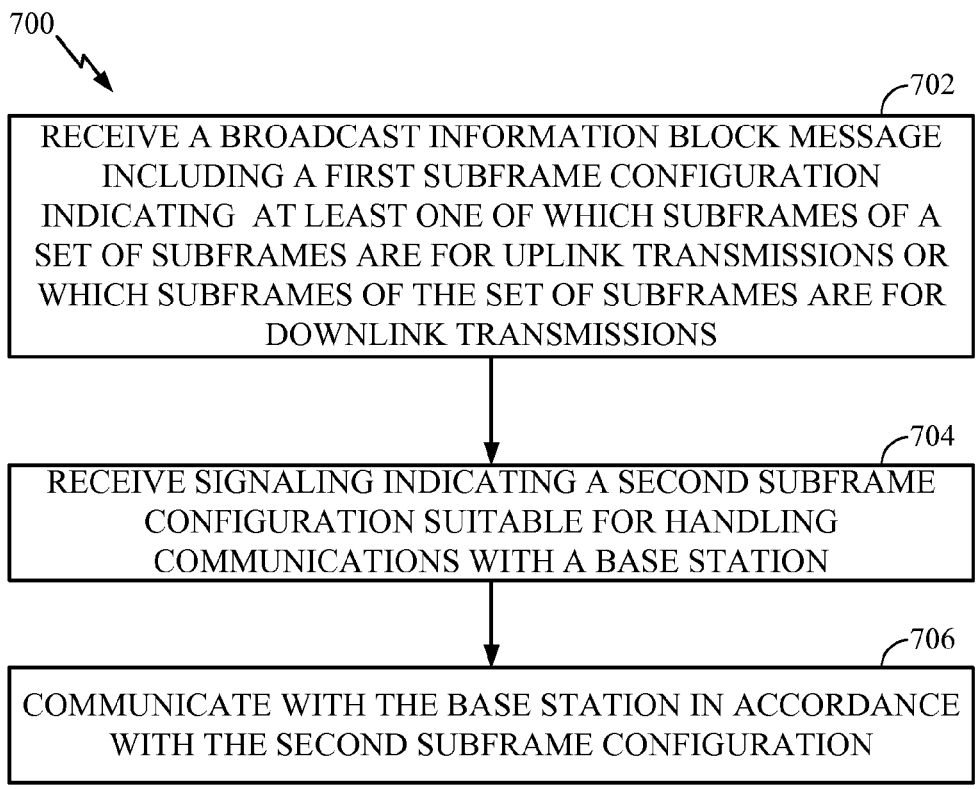
FIG. 7 illustrates example operations for detecting a change in the subframe configuration utilized among wireless communication devices, in accordance with certain aspects of the present disclosure.

FIG. 7 illustrates example operations 700 for detecting a change in the subframe configuration utilized among wireless communication devices (e.g., between a UE and a base station), in accordance with certain aspects of the present disclosure. The operations 700 may be performed, for example, by the UE. At 702, the UE may receive a broadcast information block message including a first subframe configuration indicating at least one of which subframes of a set of subframes are for uplink transmissions or which subframes of the set of subframes are for downlink transmissions.

At 704, the UE may receive signaling indicating a second subframe configuration suitable for handling communications with the base station (e.g., before receiving another broadcast information block message including a subframe configuration).

At 706, the UE may communicate with the base station in accordance with the second subframe configuration. For certain aspects, the UE may utilize a predetermined subframe configuration for handling communications with the base station if signaling indicating a second subframe configuration is not properly detected. For example, the UE may determine the second subframe configuration is not properly detected based on a cyclic redundancy check (CRC) or reliably detected base on log-likelihood ratios (LLRs). For example, the UE may assume DSUDDDDDDD (configuration #5), which may be the most conservative configuration, since the UE monitors most of the subframes for possible DL transmissions. As another example, the UE may monitor for DL transmissions in DL subframes that are common between the configurations. Referring to FIG. 5, subframes 0, 1, and 5 are designated as DL subframes between the configurations. Moreover, the UE may transmit UL transmission in subframe 2, which is common between the configurations.

As described above, dedicated signaling may be preferred if there are a limited number of UEs requiring such information. Dedicated signaling may be in the form of a physical downlink control channel (PDCCH) or an enhanced PDCCH (ePDCCH). As an example, a downlink control information (DCI) format 1A (or other DCI formats) may be re-used, wherein an information field of one or more bits may be used to indicate the DL/UL subframe configuration. For certain aspects, a new information field may be utilized for transmitting the bits, or one of the existing information fields may be reused (e.g., cross-carrier information field). The PDCCH or ePDCCH may be associated with a DL grant or a UL grant, or not with any grant. The PDCCH (or ePDCCH) may be scrambled by a cell radio network temporary identifier (C-RNTI), or a new C-RNTI (e.g., similar to semi-persistent scheduling (SPS) C-RNTI). For certain aspects, a new PDCCH (or ePDCCH) indicating a new DL/UL subframe configuration may cancel an existing DL/UL subframe configuration indication sent earlier.

For certain aspects, multicast or broadcast signaling may be utilized by the base station for signaling a change of a subframe configuration, as described above. This type of signaling may utilize an existing control channel or a new control channel. As an example, an existing PDCCH or ePDCCH may be used (e.g., through a common search space). Aggregation level 1 and/or 2 may be introduced for more efficient transmissions, since currently only aggregation levels 4 and 8 are supported. There may be CRC protection (e.g., 16-bit) for the signaling.

For certain aspects, a new channel (e.g., similar to a physical control format indicator channel (PCFICH)) may be introduced to convey such signaling. For example, three bits of information may be conveyed in, for example, 16 resource elements (REs). The new channel may use a legacy control region (e.g., utilizing a fraction of the control channel elements (CCEs)), or a data region (e.g., similar to ePDCCH). Resources utilized by the new channel may puncture resource element (REs) of other channels for legacy UEs, while non-legacy UEs may rate-match around the REs of the new channel. However, CRC may or may not be available (e.g., no CRC if PCFICH-like).

In order to improve the reliability of the UE detecting a change in the subframe configuration, the DL/UL subframe configuration may be used as an input to modify or to construct at least one physical layer characteristic of control channel transmissions for indicating the configuration, control channel transmissions during the duration (e.g., one frame) of the configuration and/or data channel transmissions during the duration of the configuration. For example, if a new channel is designed and is PCFICH-like, the initialization of the scrambling sequence may be further dependent on the DL/UL subframe configuration. Additionally, or separately, the location of the REs for the new channel may be further dependent on the DL/UL subframe configuration. Therefore, a UE assuming a wrong TDD DL/UL configuration may not decode the new channel.

As another example, during the duration of a configuration (e.g., subframe configuration #5), the scrambling sequence for a demodulation reference signal (DM-RS) of ePDCCH may be a function of the TDD DL/UL subframe configuration. Therefore, only the UEs successfully detecting the configuration in use may decode the control channel transmissions. For certain aspects, the modification of a control channel (e.g., PDCCH or ePDCCH) may be applied only to a subset. For example, the modification may be applied only to a UE-specific search space (but not to common search space), only to some subframes (but not to some other subframes), only to ePDCCH (but not to PDCCH, if the UE is configured to monitor both PDCCH and ePDCCH), or only to low aggregation levels (but not to higher aggregation levels). Therefore, there may be at least one decoding candidate that is not modified based on the subframe configuration. Such modification may be enabled for a UE by some explicit signaling (e.g., RRC), implicit signaling, and/or predetermined.

For certain aspects, if a control channel (e.g., PDCCH or ePDCCH) schedules PDSCH, an information field in the control channel may indicate which UL subframe carries the corresponding ACK/NAK. For example, if a TDD DL/UL subframe configuration is known to the UE (e.g., via other signaling), a 1-bit indication may be provided to indicate the UE is to transmit ACK/NAK in the first UL subframe (e.g., at or after 4 ms), or in the second UL subframe (e.g., at or after 4 ms). UL ACK/NAK load may be balanced in this manner. However, if the TDD DL/UL subframe configuration is not known, a 3-bit indication may be provided to indicate which subframe carries the corresponding ACK/NAK after the PDSCH subframe (subframe n), for example, n+k+4, where k=0, . . . , 7, as given by the 3-bit indication. Therefore, a UE may not need to know the TDD DL/UL subframe configuration, but may still be scheduled at least in a subframe.

Similarly, if the control channel schedules a physical uplink shared channel (PUSCH), the information field in the control channel may indicate which UL subframe is for the PUSCH transmission, or, which subframe is for the next physical hybrid ARQ indicator channel (PHICH)/PDCCH transmission of the same hybrid automatic retransmission request (HARQ) process, or a combination thereof. In this manner, signaling may provide an indication of an uplink subframe for a HARQ response in response to a downlink data transmission, an indication of an uplink subframe for an uplink data transmission, and/or an indication of a downlink subframe for a HARQ response or a control channel in response to an uplink data transmission. A similar scheme may be applied to aperiodic CQI triggering.

Alternatively, an information field of one or more bits in a control channel may indicate for downlink HARQ and/or UL HARQ operation, which TDD downlink/uplink subframe configuration is used to determine the corresponding HARQ timing. As an example, the control field may include a one-bit information field to indicate that the downlink HARQ timing is either to continue following HARQ timing based a previous subframe configuration or to follow HARQ timing based on a new subframe configuration.

Figure 8:
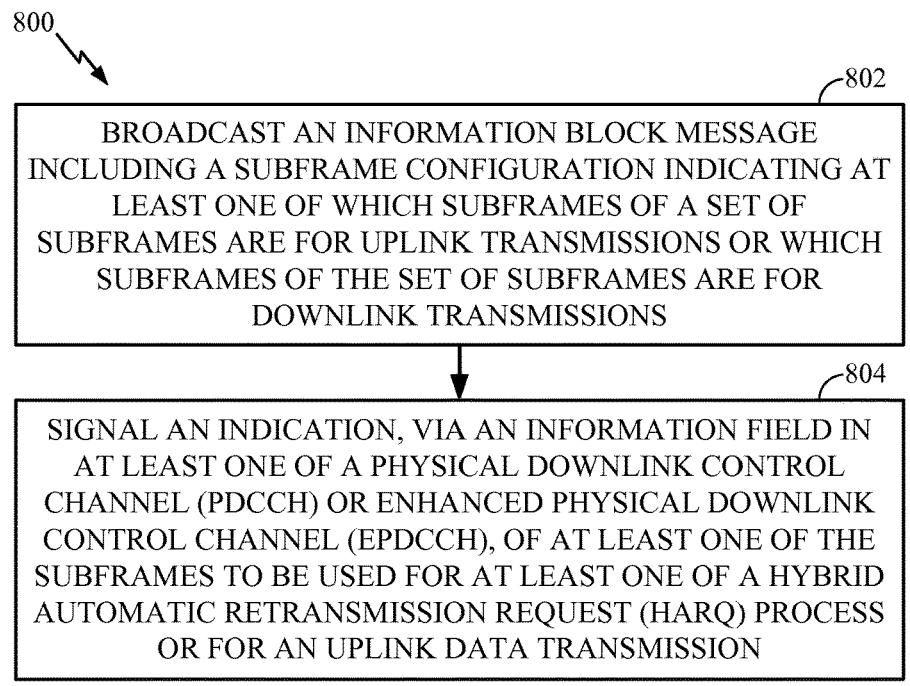
FIG. 8 illustrates example operations for dynamically changing a subframe configuration utilized among wireless communication devices, in accordance with certain aspects of the present disclosure.

FIG. 8 illustrates example operations 800 for dynamically changing a subframe configuration utilized among wireless communication devices (e.g., between one or more UEs and a base station), in accordance with certain aspects of the present disclosure. The operations 800 may be performed, for example, by the base station. At 802, the base station may broadcast an information block message including a subframe configuration indicating at least one of which subframes of a set of subframes are for uplink transmissions or which subframes of the set of subframes are for downlink transmissions. At 804, the base station may signal an indication, via an information field in at least one of a physical downlink control channel (PDCCH) or enhanced physical downlink control channel (ePDCCH), of at least one of the subframes to be used for at least one of a hybrid automatic retransmission request (HARQ) process or for an uplink data transmission.

Figure 9:
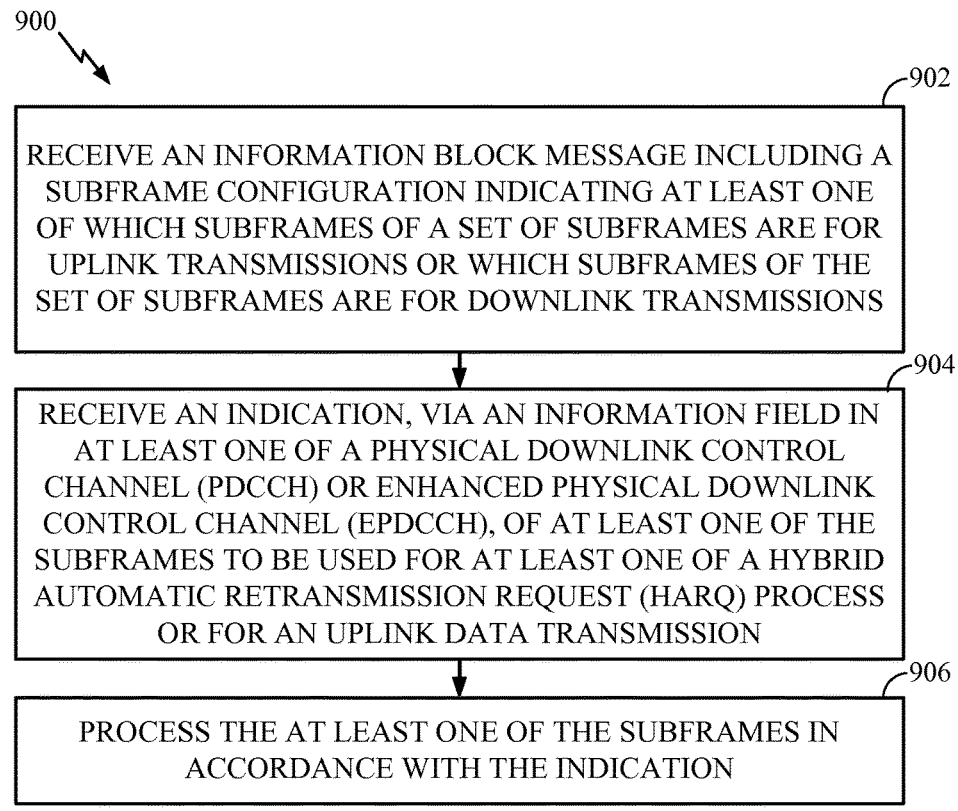
FIG. 9 illustrates example operations for detecting a change in the subframe configuration utilized among wireless communication devices, in accordance with certain aspects of the present disclosure.

FIG. 9 illustrates example operations 900 for detecting a change in the subframe configuration utilized among wireless communication devices (e.g., between a UE and a base station), in accordance with certain aspects of the present disclosure. The operations 900 may be performed, for example, by the UE. At 902, the UE may receive an information block message including a subframe configuration indicating at least one of which subframes of a set of subframes are for uplink transmissions or which subframes of the set of subframes are for downlink transmissions. At 904, the UE may receive an indication, via an information field in at least one of a physical downlink control channel (PDCCH) or enhanced physical downlink control channel (ePDCCH), of at least one of the subframes to be used for at least one of a hybrid automatic retransmission request (HARQ) process or for an uplink data transmission. At 906, the UE may process the at least one of the subframes in accordance with the indication.

Figure 10:
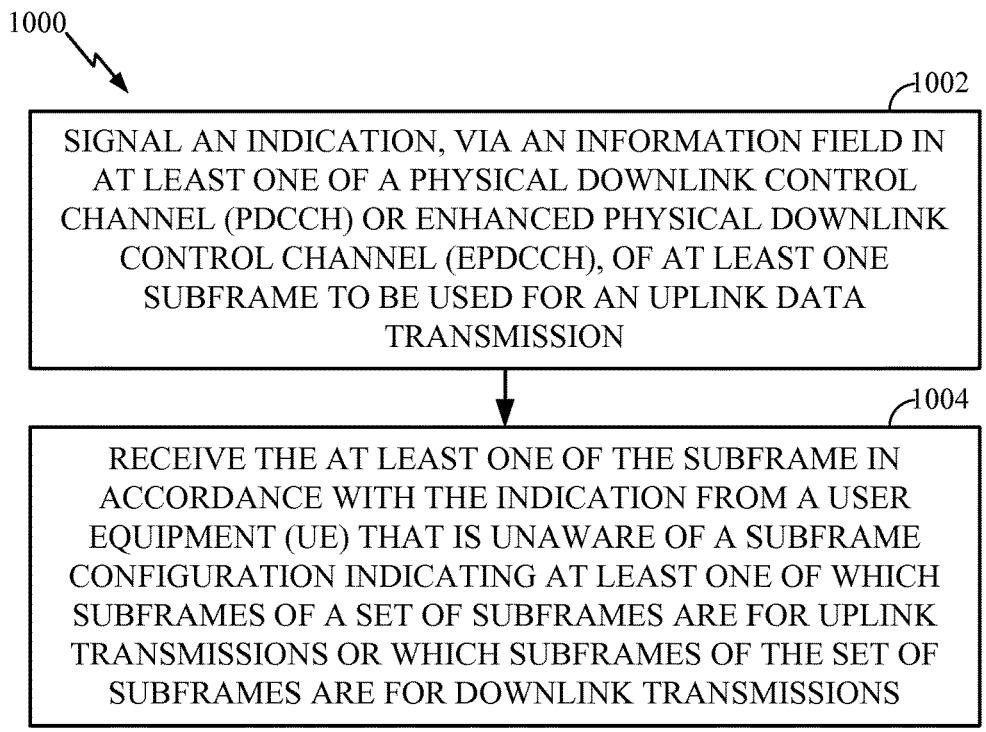
FIG. 10 illustrates example operations for dynamically changing a subframe configuration utilized among wireless communication devices, in accordance with certain aspects of the present disclosure.

FIG. 10 illustrates example operations 1000 for dynamically changing a subframe configuration utilized among wireless communication devices (e.g., between one or more UEs and a base station), in accordance with certain aspects of the present disclosure. The operations 1000 may be performed, for example, by the base station. At 1002, the base station may signal an indication, via an information field in at least one of a physical downlink control channel (PDCCH) or enhanced physical downlink control channel (ePDCCH), of at least one subframe to be used for an uplink data transmission. At 1004, the base station may receive the at least one of the subframe in accordance with the indication from a user equipment (UE) that is unaware of a subframe configuration indicating at least one of which subframes of a set of subframes are for uplink transmissions or which subframes of the set of subframes are for downlink transmissions.

Figure 11:
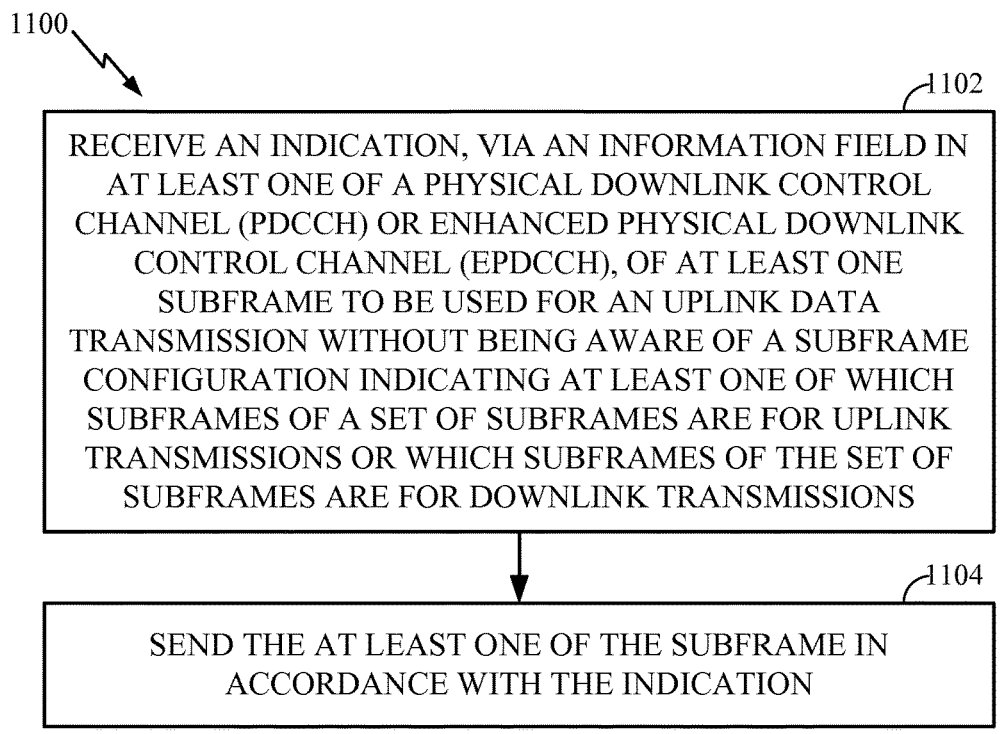
FIG. 11 illustrates example operations for detecting a change in the subframe configuration utilized among wireless communication devices, in accordance with certain aspects of the present disclosure.

FIG. 11 illustrates example operations 1100 for detecting a change in the subframe configuration utilized among wireless communication devices (e.g., between a UE and a base station), in accordance with certain aspects of the present disclosure. The operations 1100 may be performed, for example, by the UE. At 1102, the UE may receive an indication, via an information field in at least one of a physical downlink control channel (PDCCH) or enhanced physical downlink control channel (ePDCCH), of at least one subframe to be used for an uplink data transmission without being aware of a subframe configuration indicating at least one of which subframes of a set of subframes are for uplink transmissions or which subframes of the set of subframes are for downlink transmissions. At 1104, the UE may send the at least one of the subframe in accordance with the indication.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in Figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method for wireless communications, comprising:
broadcasting an information block message including a first uplink/downlink (UL/DL) subframe configuration of a plurality of UL/DL subframe configurations indicating at least one of which subframes of a set of subframes are for uplink transmissions or which subframes of the set of subframes are for downlink transmissions, wherein the first UL/DL subframe configuration comprises configuration information for all subframes in a first frame;
determining a second UL/DL subframe configuration suitable for handling communications with one or more user equipment (UEs), wherein the second UL/DL subframe configuration comprises configuration information for all subframes in a second frame; and signaling an indication of the second UL/DL subframe configuration to the one or more UEs, wherein the signaling also provides an indication of when the second UL/DL subframe configuration is to be employed, and wherein the second UL/DL subframe configuration is selected from a limited number of valid subframe configurations of the plurality of UL/DL subframe configurations determined based on the first UL/DL subframe configuration.

2. The method of claim 1, wherein:
the communications with one or more UEs comprise a burst of downlink data for a UE; and
the second UL/DL subframe configuration comprises more subframes for downlink transmissions than the first UL/DL subframe configuration.

3. The method of claim 1, wherein:
the communications with one or more UEs comprise a burst of uplink data from a UE; and
the second UL/DL subframe configuration comprises more subframes for uplink transmissions than the first UL/DL subframe configuration.

4. The method of claim 1, wherein:
the second UL/DL subframe configuration is signaled before broadcasting another information block message including a subframe configuration.

5. The method of claim 1, wherein:
the second UL/DL subframe configuration is signaled via signaling to one or more individual UEs.

6. The method of claim 1, wherein the second UL/DL subframe configuration is signaled via at least one of a physical downlink control channel (PDCCH) or enhanced physical downlink control channel (ePDCCH).

7. The method of claim 6, wherein the second UL/DL subframe configuration is signaled via an information field in at least one of the PDCCH or the ePDCCH.

8. The method of claim 1, wherein the signaling also provides an indication of a duration for utilizing the second UL/DL subframe configuration.

9. The method of claim 1, wherein:
the second UL/DL subframe configuration is signaled via a control channel transmission; and
at least one physical layer characteristic of the control channel transmission for indicating the second UL/DL subframe configuration is based on the second UL/DL subframe configuration.

10. The method of claim 9, wherein the control channel transmission comprises a set of control channel decoding candidates, wherein at least one physical layer characteristic of a first subset of the decoding candidates is based on the second UL/DL subframe configuration while physical layer characteristics of a second subset of the decoding candidates are not based on the second UL/DL subframe configuration.

11. The method of claim 1, wherein the second UL/DL subframe configuration is signaled via at least one of multicast or broadcast signaling.

12. The method of claim 1, wherein at least one physical layer characteristic of one or more portions of at least one of data channel transmission or control channel transmission is based on the second UL/DL subframe configuration.

13. The method of claim 1, wherein a location of one or more resource elements (REs) for a control channel transmission is dependent on the second UL/DL subframe configuration.

14. The method of claim 1, wherein the signaling is repeated based on a predetermined number, a broadcast signal, or a radio resource control signal.

15. The method of claim 1, further comprising signaling an indication of an uplink subframe for a hybrid automatic retransmission request (HARQ) response in response to a downlink data transmission, wherein the indication is signaled via an information field in at least one of a physical downlink control channel (PDCCH) or enhanced physical downlink control channel (ePDCCH).

16. The method of claim 1, further comprising signaling an indication of an uplink subframe for an uplink data transmission, wherein the indication is signaled via an information field in at least one of a physical downlink control channel (PDCCH) or enhanced physical downlink control channel (ePDCCH).

17. The method of claim 1, further comprising signaling an indication of a downlink subframe for a hybrid automatic retransmission request (HARQ) response or a control channel in response to an uplink data transmission, wherein the indication is signaled via an information field in at least one of a physical downlink control channel (PDCCH) or enhanced physical downlink control channel (ePDCCH).

18. The method of claim 1, wherein:
the first UL/DL subframe configuration comprises a first time division duplex (TDD) UL/DL subframe configuration, and
the second UL/DL subframe configuration comprises a second time division duplex (TDD) UL/DL subframe configuration.

19. A method for wireless communications, comprising:
receiving a broadcast information block message including a first uplink/downlink (UL/DL) subframe configuration of a plurality of UL/DL subframe configurations indicating at least one of which subframes of a set of subframes are for uplink transmissions or which subframes of the set of subframes are for downlink transmissions, wherein the first UL/DL subframe configuration comprises configuration information for all subframes in a first frame;

receiving signaling indicating a second UL/DL subframe configuration suitable for handling communications with a base station, wherein the signaling also provides an indication of when the second UL/DL subframe configuration is to be employed, and wherein the second UL/DL subframe configuration comprises configuration information for all subframes in a second frame; and communicating with the base station in accordance with the second UL/DL subframe configuration, wherein the second UL/DL subframe configuration is selected from a limited number of valid subframe configurations of the plurality of UL/DL subframe configurations determined based on the first UL/DL subframe configuration.

20. The method of claim 19, wherein:
communicating with the base station comprises a burst of downlink data from the base station; and
the second UL/DL subframe configuration comprises more subframes for downlink transmissions than the first UL/DL subframe configuration.

21. The method of claim 19, wherein:
communicating with the base station comprises a burst of uplink data for the base station; and
the second UL/DL subframe configuration comprises more subframes for uplink transmissions than the first UL/DL subframe configuration.

22. The method of claim 19, wherein:
the second UL/DL subframe configuration is signaled before receiving another broadcast information block message including a subframe configuration.

23. The method of claim 22, wherein:
the second UL/DL subframe configuration is signaled via signaling.

24. The method of claim 19, wherein the second UL/DL subframe configuration is signaled via at least one of a physical downlink control channel (PDCCH) or enhanced physical downlink control channel (ePDCCH).

25. The method of claim 24, wherein the second UL/DL subframe configuration is signaled via an information field in at least one of the PDCCH or the ePDCCH.

26. The method of claim 19, wherein the signaling also provides an indication of a duration for utilizing the second UL/DL subframe configuration.

27. The method of claim 19, wherein:
the second UL/DL subframe configuration is signaled via a control channel transmission; and
at least one physical layer characteristic of the control channel transmission for indicating the second UL/DL subframe configuration is based on the second UL/DL subframe configuration.

28. The method of claim 27, wherein the control channel transmission comprises a set of control channel decoding candidates, wherein at least one physical layer characteristic of a first subset of the decoding candidates is based on the second UL/DL subframe configuration while physical layer characteristics of a second subset of the decoding candidates are not based on the second UL/DL subframe configuration.

29. The method of claim 19, wherein at least one physical layer characteristic of one or more portions of at least one of data channel transmission or control channel transmission is based on the second UL/DL subframe configuration.

30. The method of claim 19, wherein the signaling is repeated based on a predetermined number, a broadcast signal, or a radio resource control signal.

31. The method of claim 30, wherein the signaling of the indication of the second UL/DL subframe configuration is repeated with at least one different physical layer characteristic of a control channel transmission.

32. The method of claim 19, further comprising utilizing a predetermined subframe configuration for handling communications with the base station if signaling indicating the second UL/DL subframe configuration is not properly detected.

33. The method of claim 19, wherein:
the second UL/DL subframe configuration is signaled via at least one of multicast or broadcast signaling.

34. The method of claim 19, wherein a location of one or more resource elements (REs) for a control channel transmission is dependent on the second UL/DL subframe configuration.

35. The method of claim 19, further comprising receiving signaling indicating an uplink subframe for a hybrid automatic retransmission request (HARD) response in response to a downlink data transmission, wherein the signaling indicating an uplink subframe includes an information field in at least one of a physical downlink control channel (PDCCH) or enhanced physical downlink control channel (ePDCCH).

36. The method of claim 19, further comprising receiving signaling indicating an uplink subframe for an uplink data transmission, wherein the signaling indicating an uplink subframe includes an information field in at least one of a physical downlink control channel (PDCCH) or enhanced physical downlink control channel (ePDCCH).

37. The method of claim 19, further comprising receiving signaling indicating a downlink subframe for a hybrid automatic retransmission request (HARQ) response or a control channel in response to an uplink data transmission, wherein the signaling indicating a downlink subframe includes an information field in at least one of a physical downlink control channel (PDCCH) or enhanced physical downlink control channel (ePDCCH).

38. The method of claim 19, wherein:
the first UL/DL subframe configuration comprises a first time division duplex (TDD) UL/DL subframe configuration, and
the second UL/DL subframe configuration comprises a second time division duplex (TDD) UL/DL subframe configuration.

39. A method for wireless communications, comprising:
broadcasting an information block message including a subframe configuration indicating at least one of which subframes of a set of subframes are for uplink transmissions or which subframes of the set of subframes are for downlink transmissions, wherein the subframe configuration comprises configuration information for all subframes in a frame; and
signaling an indication, via an information field scrambled by a temporary identifier in at least one of a physical downlink control channel (PDCCH) or enhanced physical downlink control channel (ePDCCH), of at least one of the subframes of the set of subframes to be used for at least one of a hybrid automatic retransmission request (HARQ) process or for an uplink data transmission, wherein the information field scrambled by the temporary identifier is based on the subframe configuration.

40. The method of claim 39, wherein signaling the indication includes signaling an indication of an uplink subframe for a hybrid automatic retransmission request (HARQ) response in response to a downlink data transmission.

41. The method of claim 39, wherein signaling the indication includes signaling an indication of an uplink subframe for an uplink data transmission.

42. The method of claim 39, wherein signaling the indication includes signaling an indication of a downlink subframe for a hybrid automatic retransmission request (HARQ) response or a control channel in response to an uplink data transmission.

43. A method for wireless communications, comprising:
receiving an information block message including a subframe configuration indicating at least one of which subframes of a set of subframes are for uplink transmissions or which subframes of the set of subframes are for downlink transmissions, wherein the subframe configuration comprises configuration information for all subframes in a frame;
receiving an indication, via an information field scrambled by a temporary identifier in at least one of a physical downlink control channel (PDCCH) or enhanced physical downlink control channel (ePDCCH), of at least one of the subframes of the set of subframes to be used for at least one of a hybrid automatic retransmission request (HARQ) process or for an uplink data transmission, wherein the information field scrambled by the temporary identifier is based on the subframe configuration; and processing the at least one of the subframes of the set of subframes in accordance with the indication.

44. The method of claim 43, wherein receiving the indication includes receiving an indication of an uplink subframe for a hybrid automatic retransmission request (HARQ) response in response to a downlink data transmission.

45. The method of claim 44, wherein receiving the indication includes receiving an indication of an uplink subframe for an uplink data transmission.

46. The method of claim 43, wherein receiving the indication includes receiving an indication of a downlink subframe for a hybrid automatic retransmission request (HARQ) response or a control channel in response to an uplink data transmission.

47. A method for wireless communications, comprising:
signaling an indication to a user equipment (UE) that is unaware of a subframe configuration indicating at least one of which subframes of a set of subframes are for uplink transmissions or which subframes of the set of subframes are for downlink transmissions, via an information field scrambled by a temporary identifier in at least one of a physical downlink control channel (PDCCH) or enhanced physical downlink control channel (ePDCCH), of at least one subframe to be used for an uplink data transmission, wherein the information field scrambled by the temporary identifier is based on the subframe configuration; and
receiving the at least one subframe in accordance with the indication from the UE, wherein the subframe configuration comprises configuration information for all subframes in a frame.

48. The method of claim 47, wherein signaling the indication includes signaling an indication of an uplink subframe, relative to subframe for a downlink transmission, for an uplink ACK/NACK transmission.

49. A method for wireless communications, comprising:
receiving an indication scrambled by a temporary identifier, via an information field in at least one of a physical downlink control channel (PDCCH) or enhanced physical downlink control channel (ePDCCH), of at least one subframe to be used for an uplink data transmission without being aware of a subframe configuration indicating at least one of which subframes of a set of subframes are for uplink transmissions or which subframes of the set of subframes are for downlink transmissions, wherein the subframe configuration comprises configuration information for all subframes in a frame, and wherein the information field scrambled by the temporary identifier is based on the subframe configuration; and
sending the at least one of the subframe in accordance with the indication.

50. The method of claim 49, wherein receiving the indication includes receiving an indication of an uplink subframe, relative to subframe for a downlink transmission, for an uplink ACK/NACK transmission.

51. An apparatus for wireless communications, comprising:
means for broadcasting an information block message including a first uplink/downlink (UL/DL) subframe configuration of a plurality of UL/DL subframe configurations indicating at least one of which subframes of a set of subframes are for uplink transmissions or which subframes of the set of subframes are for downlink transmissions, wherein the first UL/DL subframe configuration comprises configuration information for all subframes in a first frame;
means for determining a second UL/DL subframe configuration suitable for handling communications with one or more user equipment (UEs), wherein the second UL/DL subframe configuration is selected from a limited number of valid subframe configurations of the plurality of UL/DL subframe configurations determined based on the first UL/DL subframe configuration, and wherein the second UL/DL subframe configuration comprises configuration information for all subframes in a second frame; and
means for signaling an indication of the second UL/DL subframe configuration to the one or more UEs, wherein the means for signaling also provides an indication of when the second UL/DL subframe configuration is to be employed.

52. The apparatus of claim 51, wherein:
the communications with one or more UEs comprise a burst of downlink data for a UE; and
the second UL/DL subframe configuration comprises more subframes for downlink transmissions than the first UL/DL subframe configuration.

53. The apparatus of claim 51, wherein:
the communications with one or more UEs comprise a burst of uplink data from a UE; and
the second UL/DL subframe configuration comprises more subframes for uplink transmissions than the first UL/DL subframe configuration.

54. The apparatus of claim 51, wherein:
the second UL/DL subframe configuration is signaled before broadcasting another information block message including a subframe configuration.

55. The apparatus of claim 51, wherein:
the second UL/DL subframe configuration is signaled via signaling to one or more individual UEs.

56. The apparatus of claim 51, wherein the second UL/DL subframe configuration is signaled via at least one of a physical downlink control channel (PDCCH) or enhanced physical downlink control channel (ePDCCH).

57. The apparatus of claim 51, wherein the second UL/DL subframe configuration is signaled via at least one of multicast or broadcast signaling.

58. An apparatus for wireless communications, comprising:
means for receiving a broadcast information block message including a first uplink/downlink (UL/DL) subframe configuration of a plurality of UL/DL subframe configurations indicating at least one of which subframes of a set of subframes are for uplink transmissions or which subframes of the set of subframes are for downlink transmissions, wherein the first UL/DL subframe configuration comprises configuration information for all subframes in a first frame;
means for receiving signaling indicating a second UL/DL subframe configuration suitable for handling communications with a base station, wherein the signaling also provides an indication of when the second UL/DL subframe configuration is to be employed, and wherein the second UL/DL subframe configuration is selected from a limited number of valid subframe configurations of the plurality of UL/DL subframe configurations determined based on the first UL/DL subframe configuration, and wherein the second UL/DL subframe configuration comprises configuration information for all subframes in a second frame; and means for communicating with the base station in accordance with the second UL/DL subframe configuration.

59. The apparatus of claim 58, wherein:
the means for communicating with the base station comprises means for communicating via a burst of downlink data from the base station; and
the second UL/DL subframe configuration comprises more subframes for downlink transmissions than the first UL/DL subframe configuration.

60. The apparatus of claim 58, wherein:
means for communicating with the base station comprises means for communicating via a burst of uplink data for the base station; and
the second UL/DL subframe configuration comprises more subframes for uplink transmissions than the first UL/DL subframe configuration.

61. The apparatus of claim 58, wherein:
the second UL/DL subframe configuration is signaled before receiving another broadcast information block message including a subframe configuration.

62. The apparatus of claim 61, wherein:
the second UL/DL subframe configuration is signaled via signaling.

63. The apparatus of claim 58, wherein the second UL/DL subframe configuration is signaled via at least one of a physical downlink control channel (PDCCH) or enhanced physical downlink control channel (ePDCCH).

64. The apparatus of claim 58, wherein the signaling is repeated based on a predetermined number, a broadcast signal, or a radio resource control signal.

65. The apparatus of claim 64, wherein the signaling of the indication of the second UL/DL subframe configuration is repeated with at least one different physical layer characteristic of a control channel transmission.

66. The apparatus of claim 58, wherein:
the second UL/DL subframe configuration is signaled via at least one of multicast or broadcast signaling.

67. An apparatus for wireless communications, comprising:
means for broadcasting an information block message including a subframe configuration indicating at least one of which subframes of a set of subframes are for uplink transmissions or which subframes of the set of subframes are for downlink transmissions, wherein the subframe configuration comprises configuration information for all subframes in a frame; and
means for signaling an indication, via an information field scrambled by a temporary identifier in at least one of a physical downlink control channel (PDCCH) or enhanced physical downlink control channel (ePDCCH), of at least one of the subframes of the set of subframes to be used for at least one of a hybrid automatic retransmission request (HARQ) process or for an uplink data transmission, wherein the information field scrambled by the temporary identifier is based on the subframe configuration.

68. The apparatus of claim 67, wherein the means for signaling the indication includes means for signaling an indication of an uplink subframe for a hybrid automatic retransmission request (HARQ) response in response to a downlink data transmission.

69. The apparatus of claim 67, wherein the means for signaling the indication includes means for signaling an indication of an uplink subframe for an uplink data transmission.

70. An apparatus for wireless communications, comprising:
means for receiving an information block message including a subframe configuration indicating at least one of which subframes of a set of subframes are for uplink transmissions or which subframes of the set of subframes are for downlink transmissions, wherein the subframe configuration comprises configuration information for all subframes in a frame;
means for receiving an indication, via an information field scrambled by a temporary identifier in at least one of a physical downlink control channel (PDCCH) or enhanced physical downlink control channel (ePDCCH), of at least one of the subframes of the set of subframes to be used for at least one of a hybrid automatic retransmission request (HARQ) process or for an uplink data transmission, wherein the information field scrambled by the temporary identifier is based on the subframe configuration; and
means for processing the at least one of the subframes of the set of subframes in accordance with the indication.

71. The apparatus of claim 70, wherein the means for receiving the indication includes means for receiving an indication of an uplink subframe for a hybrid automatic retransmission request (HARQ) response in response to a downlink data transmission.

72. The apparatus of claim 71, wherein the means for receiving the indication includes means for receiving an indication of an uplink subframe for an uplink data transmission.

73. An apparatus for wireless communications, comprising:
means for signaling an indication to a user equipment (UE) that is unaware of a subframe configuration indicating at least one of which subframes of a set of subframes are for uplink transmissions or which subframes of the set of subframes are for downlink transmissions, via an information field scrambled by a temporary identifier in at least one of a physical downlink control channel (PDCCH) or enhanced physical downlink control channel (ePDCCH), of at least one subframe to be used for an uplink data transmission, wherein the information field scrambled by the temporary identifier is based on the subframe configuration; and
means for receiving the at least one subframe in accordance with the indication from the UE, wherein the subframe configuration comprises configuration information for all subframes in a frame.

74. The apparatus of claim 73, wherein the means for signaling the indication includes means for signaling an indication of an uplink subframe, relative to subframe for a downlink transmission, for an uplink ACK/NACK transmission.

75. An apparatus for wireless communications, comprising:
means for receiving an indication, via an information field scrambled by a temporary identifier in at least one of a physical downlink control channel (PDCCH) or enhanced physical downlink control channel (ePDCCH), of at least one subframe to be used for an uplink data transmission without being aware of a subframe configuration indicating at least one of which subframes of a set of subframes are for uplink transmissions or which subframes of the set of subframes are for downlink transmissions, wherein the subframe configuration comprises configuration information for all subframes in a frame, and wherein the information field scrambled by the temporary identifier is based on the subframe configuration; and means for sending the at least one subframe in accordance with the indication.

76. The apparatus of claim 75, wherein the means for receiving the indication includes means for receiving an indication of an uplink subframe, relative to subframe for a downlink transmission, for an uplink ACK/NACK transmission.

77. An apparatus for wireless communications, comprising:
at least one processor configured to broadcast an information block message including a first uplink/downlink (UL/DL) subframe configuration of a plurality of UL/DL subframe configurations indicating at least one of which subframes of a set of subframes are for uplink transmissions or which subframes of the set of subframes are for downlink transmissions, wherein the first UL/DL subframe configuration comprises configuration information for all subframes in a first frame, determine a second UL/DL subframe configuration suitable for handling communications with one or more user equipment (UEs), and signal an indication of the second UL/DL subframe configuration to the one or more UEs, wherein the signaling also provides an indication of when the second UL/DL subframe configuration is to be employed, wherein the second UL/DL subframe configuration is selected from a limited number of valid subframe configurations of the plurality of UL/DL subframe configurations determined based on the first UL/DL subframe configuration, and wherein the second UL/DL subframe configuration comprises configuration information for all subframes in a second frame; and
a memory coupled with the at least one processor.

78. The apparatus of claim 77, wherein:
the communications with one or more UEs comprise a burst of downlink data for a UE; and
the second UL/DL subframe configuration comprises more subframes for downlink transmissions than the first UL/DL subframe configuration.

79. The apparatus of claim 77, wherein:
the communications with one or more UEs comprise a burst of uplink data from a UE; and
the second UL/DL subframe configuration comprises more subframes for uplink transmissions than the first UL/DL subframe configuration.

80. The apparatus of claim 77, wherein:
the second UL/DL subframe configuration is signaled before broadcasting another information block message including a subframe configuration.

81. An apparatus for wireless communications, comprising:
at least one processor configured to:
receive a broadcast information block message including a first uplink/downlink (UL/DL) subframe configuration of a plurality of UL/DL subframe configurations indicating at least one of which subframes of a set of subframes are for uplink transmissions or which subframes of the set of subframes are for downlink transmissions, wherein the first UL/DL subframe configuration comprises configuration information for all subframes in a first frame,
receive signaling indicating a second UL/DL subframe configuration suitable for handling communications with a base station, wherein the signaling also provides an indication of when the second UL/DL subframe configuration is to be employed, and
communicate with the base station in accordance with the second UL/DL subframe configuration, wherein the second UL/DL subframe configuration is selected from a limited number of valid subframe configurations of the plurality of UL/DL subframe configurations determined based on the first UL/DL subframe configuration, and wherein the second UL/DL subframe configuration comprises configuration information for all subframes in a second frame; and
a memory coupled with the at least one processor.

82. The apparatus of claim 81, wherein:
the at least one processor is configured to communicate with the base station via a burst of downlink data from the base station; and
the second UL/DL subframe configuration comprises more subframes for downlink transmissions than the first UL/DL subframe configuration.

83. The apparatus of claim 81, wherein:
the at least one processor is configured to communicate with the base station via a burst of uplink data for the base station; and
the second UL/DL subframe configuration comprises more subframes for uplink transmissions than the first UL/DL subframe configuration.

84. The apparatus of claim 81, wherein:
the second UL/DL subframe configuration is signaled before receiving another broadcast information block message including a subframe configuration.

85. An apparatus for wireless communications, comprising:
at least one processor configured to broadcast an information block message including a subframe configuration indicating at least one of which subframes of a set of subframes are for uplink transmissions or which subframes of the set of subframes are for downlink transmissions and signal an indication, via an information field scrambled by a temporary identifier in at least one of a physical downlink control channel (PDCCH) or enhanced physical downlink control channel (ePDCCH), of at least one of the subframes of the set of subframes to be used for at least one of a hybrid automatic retransmission request (HARQ) process or for an uplink data transmission, wherein the subframe configuration comprises configuration information for all subframes in a frame, and wherein the information field scrambled by the temporary identifier is based on the subframe configuration; and
a memory coupled with the at least one processor.

86. The apparatus of claim 85, wherein the at least one processor is configured to signal the indication via an indication of an uplink subframe for a hybrid automatic retransmission request (HARQ) response in response to a downlink data transmission.

87. The apparatus of claim 85, wherein the at least one processor is configured to signal the indication via an indication of an uplink subframe for an uplink data transmission.

88. An apparatus for wireless communications, comprising:
at least one processor configured to receive an information block message including a subframe configuration indicating at least one of which subframes of a set of subframes are for uplink transmissions or which subframes of the set of subframes are for downlink transmissions, receive an indication, via an information field scrambled by a temporary identifier in at least one of a physical downlink control channel (PDCCH) or enhanced physical downlink control channel (ePDCCH), of at least one of the subframes of the set of subframes to be used for at least one of a hybrid automatic retransmission request (HARQ) process or for an uplink data transmission, and process the at least one of the subframes of the set of subframes in accordance with the indication, wherein the subframe configuration comprises configuration information for all subframes in a frame, and wherein the information field scrambled by the temporary identifier is based on the subframe configuration; and a memory coupled with the at least one processor.

89. The apparatus of claim 88, wherein the at least one processor is configured to receive the indication via an indication of an uplink subframe for a hybrid automatic retransmission request (HARQ) response in response to a downlink data transmission.

90. The apparatus of claim 89, wherein the at least one processor is configured to receive the indication via an indication of an uplink subframe for an uplink data transmission.

91. An apparatus for wireless communications, comprising:
at least one processor configured to signal an indication to a user equipment (UE) that is unaware of a subframe configuration indicating at least one of which subframes of a set of subframes are for uplink transmissions or which subframes of the set of subframes are for downlink transmissions, via an information field scrambled by a temporary identifier in at least one of a physical downlink control channel (PDCCH) or enhanced physical downlink control channel (ePDCCH), of at least one subframe to be used for an uplink data transmission and receive the at least one subframe in accordance with the indication from the UE, wherein the subframe configuration comprises configuration information for all subframes in a frame, and wherein the information field scrambled by the temporary identifier is based on the subframe configuration; and a memory coupled with the at least one processor.

92. The apparatus of claim 91, wherein the at least one processor is configured to signal the indication via an indication of an uplink subframe, relative to subframe for a downlink transmission, for an uplink ACK/NACK transmission.

93. An apparatus for wireless communications, comprising:
at least one processor configured to receive an indication, via an information field scrambled by a temporary identifier in at least one of a physical downlink control channel (PDCCH) or enhanced physical downlink control channel (ePDCCH), of at least one subframe to be used for an uplink data transmission without being aware of a subframe configuration indicating at least one of which subframes of a set of subframes are for uplink transmissions or which subframes of the set of subframes are for downlink transmissions and send the at least one subframe in accordance with the indication, wherein the subframe configuration comprises configuration information for all subframes in a frame, and wherein the information field scrambled by the temporary identifier is based on the subframe configuration; and a memory coupled with the at least one processor.

94. The apparatus of claim 93, wherein the at least one processor is configured to receive the indication via an indication of an uplink subframe, relative to subframe for a downlink transmission, for an uplink ACK/NACK transmission.

95. A non-transitory computer readable medium having instructions stored thereon for:
broadcasting an information block message including a first uplink/downlink (UL/DL) subframe configuration of a plurality of UL/DL subframe configurations indicating at least one of which subframes of a set of subframes are for uplink transmissions or which subframes of the set of subframes are for downlink transmissions, wherein the first UL/DL subframe configuration comprises configuration information for all subframes in a first frame;

determining a second UL/DL subframe configuration suitable for handling communications with one or more user equipment (UEs), wherein the second UL/DL subframe configuration is selected from a limited number of valid subframe configurations of the plurality of UL/DL subframe configurations determined based on the first UL/DL subframe configuration, wherein the second UL/DL subframe configuration comprises configuration information for all subframes in a second frame; and signaling an indication of the second UL/DL subframe configuration to the one or more UEs, wherein the signaling also provides an indication of when the second UL/DL subframe configuration is to be employed.

96. The non-transitory computer readable medium of claim 95, wherein:
the communications with one or more UEs comprise a burst of downlink data for a UE; and
the second UL/DL subframe configuration comprises more subframes for downlink transmissions than the first UL/DL subframe configuration.

97. A non-transitory computer readable medium having instructions stored thereon for:
receiving a broadcast information block message including a first uplink/downlink (UL/DL) subframe configuration of a plurality of UL/DL subframe configurations indicating at least one of which subframes of a set of subframes are for uplink transmissions or which subframes of the set of subframes are for downlink transmissions, wherein the first UL/DL subframe configuration comprises configuration information for all subframes in a first frame;

receiving signaling indicating a second UL/DL subframe configuration suitable for handling communications with a base station, wherein the signaling also provides an indication of when the second UL/DL subframe configuration is to be employed, wherein the second UL/DL subframe configuration is selected from a limited number of valid subframe configurations of the plurality of UL/DL subframe configurations determined based on the first UL/DL subframe configuration, and wherein the second UL/DL subframe configuration comprises configuration information for all subframes in a second frame; and communicating with the base station in accordance with the second UL/DL subframe configuration.

98. The non-transitory computer readable medium of claim 97, wherein:

the communicating comprises communicating with the base station via a burst of downlink data from the base station; and the second UL/DL subframe configuration comprises more subframes for downlink transmissions than the first UL/DL subframe configuration.

99. A non-transitory computer readable medium having instructions stored thereon for:

broadcasting an information block message including a subframe configuration indicating at least one of which subframes of a set of subframes are for uplink transmissions or which subframes of the set of subframes are for downlink transmissions, wherein the subframe configuration comprises configuration information for all subframes in a frame; and signaling an indication, via an information field scrambled by a temporary identifier in at least one of a physical downlink control channel (PDCCH) or enhanced physical downlink control channel (ePDCCH), of at least one of the subframes of the set of subframes to be used for at least one of a hybrid automatic retransmission request (HARQ) process or for an uplink data transmission, wherein the information field scrambled by the temporary identifier is based on a subframe configuration.

100. The non-transitory computer readable medium of claim 99, wherein signaling the indication is via an indication of an uplink subframe for a hybrid automatic retransmission request (HARQ) response in response to a downlink data transmission.

101. A non-transitory computer readable medium having instructions stored thereon for:

receiving an information block message including a subframe configuration indicating at least one of which subframes of a set of subframes are for uplink transmissions or which subframes of the set of subframes are for downlink transmissions, wherein the subframe configuration comprises configuration information for all subframes in a frame;

receiving an indication, via an information field scrambled by a temporary identifier in at least one of a physical downlink control channel (PDCCH) or enhanced physical downlink control channel (ePDCCH), of at least one of the subframes of the set of subframes to be used for at least one of a hybrid automatic retransmission request (HARQ) process or for an uplink data transmission, wherein the information field scrambled by the temporary identifier is based on the subframe configuration; and processing the at least one of the subframes in accordance with the indication.

102. The non-transitory computer readable medium of claim 101, wherein receiving the indication is via an indication of an uplink subframe for a hybrid automatic retransmission request (HARQ) response in response to a downlink data transmission.

103. A non-transitory computer readable medium having instructions stored thereon for:

signaling an indication to a user equipment (UE) that is unaware of a subframe configuration indicating at least one of which subframes of a set of subframes are for uplink transmissions or which subframes of the set of subframes are for downlink transmissions, via an information field scrambled by a temporary identifier in at least one of a physical downlink control channel (PDCCH) or enhanced physical downlink control channel (ePDCCH), of at least one subframe to be used for an uplink data transmission, wherein the information field scrambled by the temporary identifier is based on the subframe configuration;

receiving the at least one of the subframe in accordance with the indication from the UE; and indicating at least one of which subframes of the set of subframes are for uplink transmissions or which subframes of the set of subframes are for downlink transmissions, wherein the subframe configuration comprises configuration information for all subframes in a frame.

104. The non-transitory computer readable medium of claim 103, wherein signaling the indication is via an indication of an uplink subframe, relative to subframe for a downlink transmission, for an uplink ACK/NACK transmission.

105. A non-transitory computer readable medium having instructions stored thereon for:

receiving an indication, via an information field scrambled by a temporary identifier in at least one of a physical downlink control channel (PDCCH) or enhanced physical downlink control channel (ePDCCH), of at least one subframe to be used for an uplink data transmission without being aware of a subframe configuration indicating at least one of which subframes of a set of subframes are for uplink transmissions or which subframes of the set of subframes are for downlink transmissions, wherein the at least one of the subframes is configured based on a selection from a limited number of valid configurations determined based on the subframe configuration, wherein the subframe configuration comprises configuration information for all subframes in a frame, and wherein the information field scrambled by the temporary identifier is based on the subframe configuration; and sending the at least one of the subframe of the set of subframes in accordance with the indication.

106. The non-transitory computer readable medium of claim 105, wherein receiving the indication is via an indication of an uplink subframe, relative to subframe for a downlink transmission, for an uplink ACK/NACK transmission.

\* \* \* \* \*